United States Patent [19]
Jolly et al.

[11] Patent Number: 5,845,236
[45] Date of Patent: Dec. 1, 1998

[54] HYBRID ACTIVE-PASSIVE NOISE AND VIBRATION CONTROL SYSTEM FOR AIRCRAFT

[75] Inventors: Mark R. Jolly, Holly Springs; Dino J. Rossetti, Chapel Hill; Mark A. Norris, Apex; Lane R. Miller, Fuquay Varina, all of N.C.

[73] Assignee: Lord Corporation, Cary, N.C.

[21] Appl. No.: 730,773

[22] Filed: Oct. 16, 1996

[51] Int. Cl.$^6$ ............................................. F16F 7/10
[52] U.S. Cl. ........................... 702/195; 702/56; 248/550; 248/636; 248/638; 267/136; 267/140.11
[58] Field of Search .................... 364/574, 508; 248/550, 636, 638; 267/136, 140.11; 702/195, 56

[56] References Cited

U.S. PATENT DOCUMENTS

| | | | |
|---|---|---|---|
| 2,361,071 | 10/1944 | Vang | 188/1 |
| 3,477,665 | 11/1969 | Legrand | 244/17.25 |
| 3,487,888 | 1/1970 | Adams et al. | 181/33 |
| 3,490,556 | 1/1970 | Bennett, Jr. et al. | 181/33 |
| 3,668,939 | 6/1972 | Schrader | 74/61 |
| 4,083,433 | 4/1978 | Geohegan, Jr. et al. | 188/1 B |
| 4,153,815 | 5/1979 | Chaplin et al. | 179/1 P |
| 4,458,862 | 7/1984 | Mouille et al. | 244/17.27 |
| 4,562,589 | 12/1985 | Warnaka et al. | 381/71 |
| 4,689,821 | 8/1987 | Salikuddin et al. | 381/71 |
| 4,715,559 | 12/1987 | Fuller | 244/1 N |
| 4,811,919 | 3/1989 | Jones | 244/54 |
| 4,969,632 | 11/1990 | Hodgson et al. | 267/140.1 |
| 5,108,045 | 4/1992 | Law et al. | 241/54 |
| 5,170,433 | 12/1992 | Elliot et al. | 381/47 |
| 5,174,552 | 12/1992 | Hodgson et al. | 267/140.11 |
| 5,219,143 | 6/1993 | Staple et al. | 248/550 |
| 5,251,863 | 10/1993 | Gossman et al. | 248/550 |
| 5,310,137 | 5/1994 | Yoerkie, Jr. et al. | 244/17.27 |
| 5,332,061 | 7/1994 | Majeed et al. | 180/312 |
| 5,361,878 | 11/1994 | Borsati | 188/378 |
| 5,423,658 | 6/1995 | Pla et al. | 415/118 |
| 5,427,347 | 6/1995 | Swanson et al. | 248/550 |
| 5,478,199 | 12/1995 | Gliebe | 415/119 |
| 5,526,292 | 6/1996 | Hodgson et al. | 364/574 |
| 5,551,650 | 9/1996 | Southward et al. | 244/54 |

FOREIGN PATENT DOCUMENTS

| | | |
|---|---|---|
| WO 94/29846 | 12/1994 | WIPO . |
| WO 96/12121 | 4/1996 | WIPO . |

OTHER PUBLICATIONS

Potter et al., "*Elastomers+Fluids+Electronics=Improved Comfort and Reliability for Aircraft*", Paper No. III.5, Lord Corporation Aug. 30–Sep.1, 1995 (see p. 14).

Ivers et al., "*Active Mounting System Flight Test Results*", Lord Corporation, Internoise 95, Jul. 10–12, 1995, California.

Jolly et al., "*A Demonstration of Active Control for Helicopter Cabin Noise Reduction*", 20$^{th}$ European Rotor Forum, Oct., 1994.

Lord Brochure, LORD® Aerospace, "*Turned Vibration Absorbers—A Quiet Revolution*", Sold since Aug., 1992.

(List continued on next page.)

*Primary Examiner*—John Barlow
*Assistant Examiner*—Hien Vo
*Attorney, Agent, or Firm*—Randall S. Wayland

[57] ABSTRACT

A hybrid active-passive system (20) for reducing noise within a passenger compartment and vibration of a fuselage of a vehicle, such as an aircraft (turboprop, turbofan, or helicopter). The hybrid active-passive system (20) includes, in combination: an active acoustic producer such as a loudspeaker (35), Active Vibration Absorber (AVA) (34), or active absorber assembly (39) for producing antinoise within the compartment (42), and a passive resonant device, such as a passive Tuned Vibration Absorber (TVA) (36), or passive TVA assembly (37) for controlling vibration of the fuselage or structural supports interconnecting the disturbance source (e.g. power plants (26), propellers (28*a*)), gearbox (57), main rotor (28*m*), tail rotor (28*t*)) and the fuselage wall (25).

21 Claims, 10 Drawing Sheets

OTHER PUBLICATIONS

Waterman et al., "*Fokker's Activities in Cabin Noise Control for Propeller Aircraft*", Apr. 12–15, 1983.

Lord Patent Application, IR–2388(ES), "*Active Structural Control System and Method Including Active Vibration Absorbers (AVAs)*", USSN: 08/693,742 filed Aug. 7, 1996.

IR–2346(ES), Lord Patent Application, "*Active Noise Control System for Closed Spaces Such as Aircraft Cabins*", S.N. 08/533,227, Filed Aug. 25, 1995.

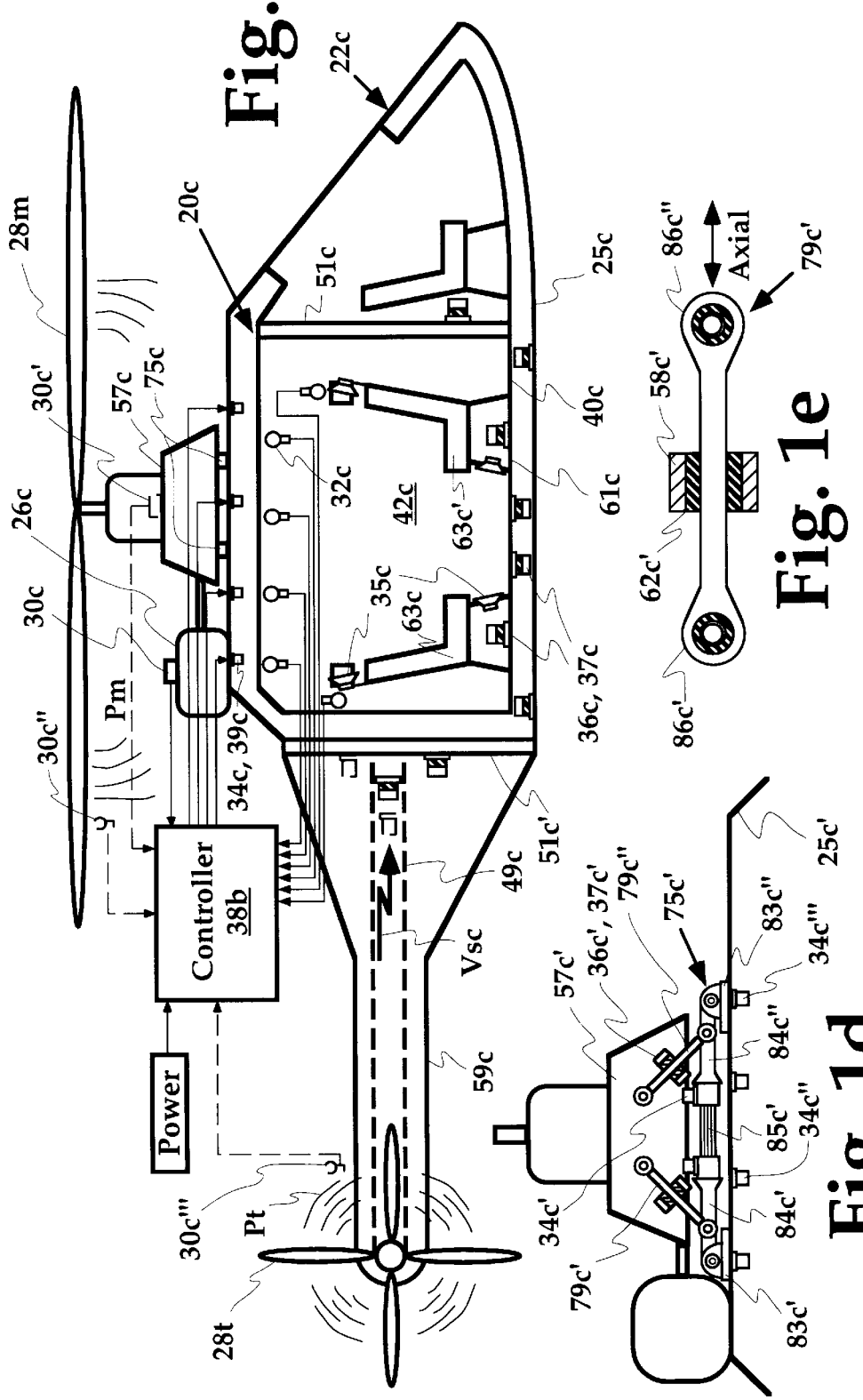

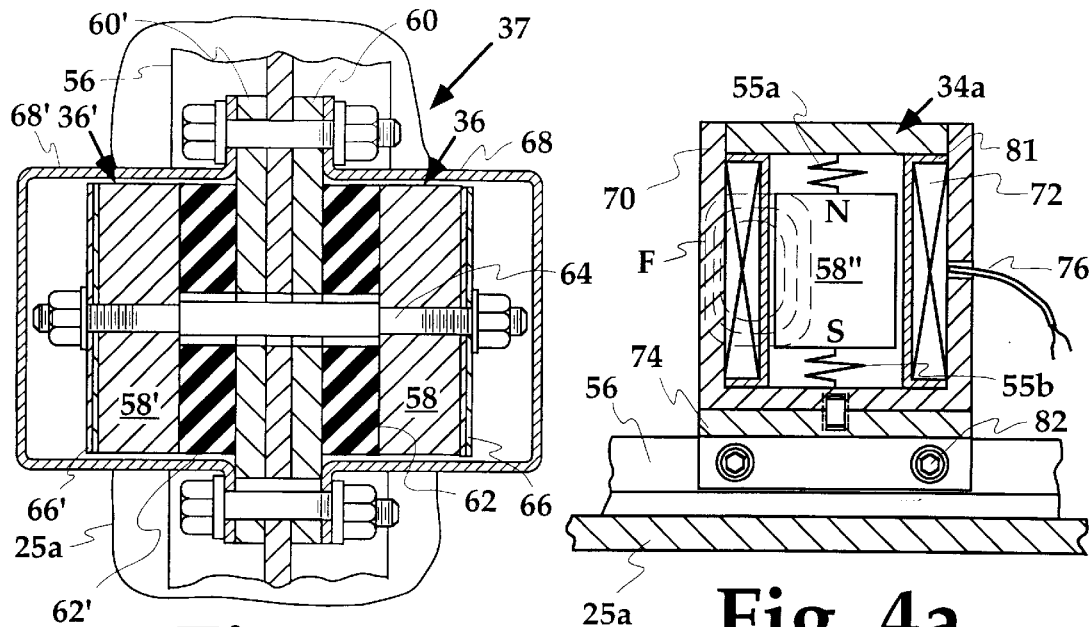
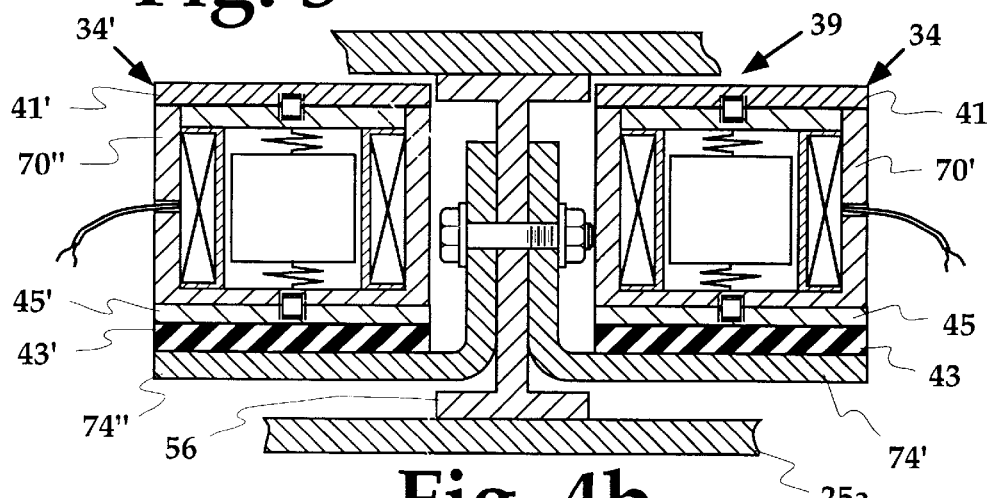
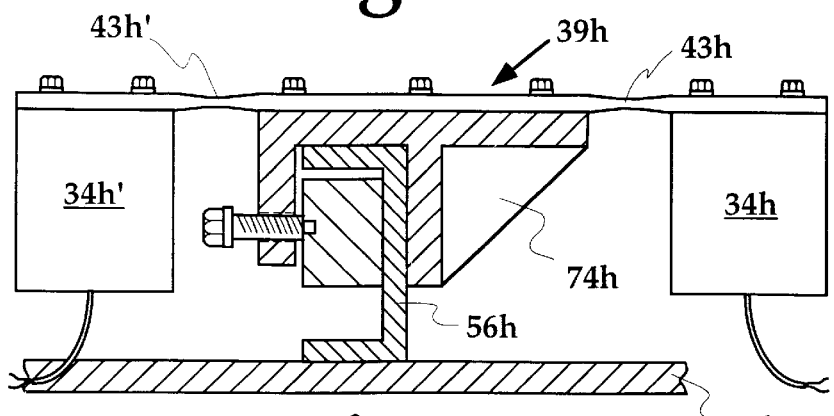

HYBRID ACTIVE-PASSIVE NOISE AND VIBRATION CONTROL SYSTEM FOR AIRCRAFT

BACKGROUND OF THE INVENTION

The present invention relates to systems for controlling vibration of vehicle structures and noise within aircraft passenger compartments.

BACKGROUND OF THE INVENTION

Various solutions have been employed to individually control/minimize vibration of structures and/or noise within closed spaces, such as in aircraft fuselages and passenger compartments. For example, passive elastomeric engine mounts have been employed for isolating an airframe from an engine. An example of a passive engine mount for an aircraft vehicle can be found in commonly assigned U.S. Pat. No. 5,108,045 to Law et al. entitled "Engine Mounting Assembly."

Although, good vibration isolation may be achieved with passive engine mounts, improved vibration isolation may be achieved by using passive fluid mounts, which utilize fluid inertia or damping effects to achieve enhanced isolation characteristics that vary as a function of frequency. An example of a passive fluid mount can be found in commonly assigned U.S. Pat. No. 4,811,919 to Jones entitled "Volume Compensated Fluid Mount".

When a broader frequency range of vibration isolation is required, an adaptive fluid mount may be employed which adapts its characteristics by changing one or more result-effective variable. An example of an adaptive fluid mount can found in commonly assigned U.S. Pat. No. 4,969,632 to Hodgson et al. entitled "Mount With Adjustable Length Inertia Track" where the inertia track length (the result-effective variable) is changed to tune the isolation characteristics, i.e., the position of the dynamic stiffness notch.

To accomplish even better vibration isolation, Active Isolation Control (AIC) systems including active mounts may be used. AIC systems including active mounts can achieve higher forces than the afore-mentioned passive, fluid, or adaptive mounts and provide enhanced isolation over a broader range of frequencies. Commonly assigned U.S. Pat. No. 5,174,552 to Hodgson et al. entitled "Fluid Mount With Active Vibration Control" teaches an actively-controlled fluid mounting. Systems employing active mountings can be found in commonly assigned U.S. Pat. Nos. 5,427,347 to Swanson et al. entitled "Apparatus For Controlling Active Mounts", U.S. Pat. No. 5,551,650 to Southward et al. entitled "Active Mounts For Aircraft Engines", and U.S. Pat. No. 5,526,292 to Hodgson et al. entitled "Broadband Noise And Vibration Reduction."

Where mountings (passive, fluid, or active) are difficult to employ for space considerations or other reasons, passive Tuned Vibration Absorbers (TVAs) may be employed to cancel vibration and/or structural-vibration related noise. TVA assemblies for attachment to the stiffening members of an aircraft fuselage for controlling vibration of, and structural vibration-related noise within, the aircraft's cabin are available from Lord® Corporation, Mechanical Products Division of Erie, Pennsylvania, under Part Number J-23091-3. Co-pending U.S. Pat. No. 5,687,948 to Whiteford et. al. entitled "Vibration Isolation System Including A Passive Tuned Vibration Absorber" teaches the combination of a TVA located proximate to an elastomer mount. Other TVAs are taught in U.S. Pat. No. 5,361,878 to Borsati entitled "Dynamic Two Frequency Vibration Damper", U.S. Pat. No. 3,490,556 to Bennett, Jr. et al. Entitled Aircraft Cabin Noise Reduction System With Tuned Vibration Absorbers", and metal beam-type TVAs as taught in SAE paper 830736 by E. H. Waterman, D. Kaptein, and S. L. Sarin entitled "Fokker's Activities In Cabin Noise Control For Propeller Aircraft." Unfortunately, in some applications, vibration may be controlled by the application of TVAs to the fuselage structure, but noise within the passenger compartment may be unaffected or may even be made worse at various locations. Large numbers of TVAs may be needed to provide good global attenuation, resulting in heavy systems. Further, the passive TVAs have a narrow operating range, and may be ineffective outside of that range.

In cases where TVAs prove insufficient to produce adequate forces or have too narrow of an operating range, Active Structural Control (ASC) systems including Active Vibration Absorbers (AVAs) attached to the fuselage frame or other structural member may be employed to control noise within the passenger compartment. Application publication WO 96/12121 entitled "Active Systems And Devices Including Active Vibration Absorbers (AVAs)" describes several AVAs and AVA assemblies which may attach to an inner member of an elastomer mounting, to a structure, or the like, and allow isolation over a wider frequency range. Commonly assigned U.S. application Ser. No. 08/693,742 entitled "Active Structural Control System and Method Including Active Vibration Absorbers (AVAs)" describes AVAs attached to the yoke of an aircraft for cancelling acoustic noise within the aircraft's cabin. U.S. Pat. No. 4,715,559 to Fuller describes an apparatus, including shaker-like members attached to the interior surface of an aircraft's fuselage wall, which produces anti-noise within an aircraft cabin via vibrating the fuselage wall. Notably, as was discovered by the inventors herein, in certain applications, the shaker-like members or AVAs while generating anti-noise within the cabin via locally driving the attachment points, have the associated problem that they increase the structural-borne vibration of the fuselage at points which are spaced away from the shaker-like members' or AVAs'. In particular, this vibration condition may be objectionable or annoying to the passengers.

Active Noise Control (ANC) systems may be employed where Active Isolation Control (AIC) or Active Structural Control (ASC) systems are difficult to implement. ANC systems, of the feedforward type include an input sensor for deriving an input signal indicative of the rotation or vibration of the source of disturbance, error sensors for determining residual acoustic sounds in the areas where noise attenuation is sought, and loudspeakers for generating the cancelling acoustic noise within the compartment. Examples of ANC systems may be found in U.S. Pat. Nos. 4,562,589 to Warnaka et al. entitled "Active Attenuation Of Noise In A Closed Structure", U.S. Pat. No. 4,153,815 to Chaplin et al. entitled "Active Attenuation Of Recurring Sound", U.S. Pat. No. 5,170,433 to Elliott et al. entitled "Active Vibration Control", and commonly assigned U.S. patent application Ser. No. 08/533,227 to Billoud entitled "Active Noise Control System For Closed Spaces Such As Aircraft Cabins." Notably, ANC systems are ineffective at reducing structure-borne vibration, and may under certain circumstances even produce it. This vibration may, in certain applications, serve as an annoyance to passengers. Further, ANC systems generally require a large number of error sensors and speakers to attenuate low frequency noise.

In summary, for certain applications, passive devices may prove inadequate in terms of force generation capability, range of operation, or degree of isolation/noise cancellation achievable. Moreover, for some aircraft applications, passive devices may be ineffective at cancelling noise within the passenger compartment, such as when the vibrational modes are not strongly coupled to the interior passenger compartment acoustics. Likewise, for certain applications, especially large-dimensional systems (systems requiring a large number of active elements to accomplish global noise reductions), such as large-dimensional ASC or ANC systems, the requirement of having a large number of speakers or active vibration absorbers may prove to be too expensive and/or too complex. Further, in some cases, ASC and ANC systems may cancel noise effectively, but at the expense of increasing vibration in certain areas of the structure, or simply being ineffective at vibration cancellation.

SUMMARY OF THE INVENTION

In light of the limitations and drawbacks of the prior art, the present invention is a hybrid active-passive noise and vibration control system which provides a system for simultaneous reduction of both noise and vibration that takes full advantage of benefits provided by ASC/ANC systems and systems employing passive resonant devices such as TVAs, yet, when applied in combination, remedies the drawbacks of each individually.

It is an advantage of the present invention that the system can simultaneously cancel both noise within the passenger compartment and vibration of the structure about the compartment and fuselage.

It is an advantage of the present invention that the system can effectively cancel low-frequency propeller-induced noise and vibration in turboprop aircraft.

It is an advantage of the present invention that the system is particularly effective at cancelling noise and vibration yet is less expensive and complicated than the fully-active ASC/ANC systems of the prior art.

The abovementioned and further novel details, features, and advantages of the present invention will become apparent from the accompanying descriptions of the preferred embodiment and the attached drawings.

BRIEF DESCRIPTION OF THE DRAWINGS

The accompanying drawings, which form a part of the specification, illustrate several embodiments of the present invention. The drawings together with the description serve to fully explain the invention. In the drawings:

FIG. 1c is a partial cross-sectional side view of a helicopter aircraft illustrating another embodiment of the hybrid active-passive system, FIG. 1d is a partial cross-sectional side view of a portion of a helicopter aircraft illustrating another embodiment of the hybrid active-passive system including a nodal beam gearbox mounting assembly, FIG. 1e is a partial cross-sectional side view of a TVA attached to a link in the nodal beam gearbox mounting assembly, FIG. 3 is a partial cross-sectional top view of one type of passive resonant device (e.g. a TVA assembly) which may be used in the hybrid active-passive system, FIG. 4a is a partial cross-sectional side view of one type of active acoustic producer (e.g. an AVA) which may be used in the hybrid active-passive system, FIG. 4b is a partial cross-sectional side view of another type of active acoustic producer (e.g. an AVA assembly employing multiple MDOF AVAs) which may be used in the hybrid active-passive system, FIG. 5 is a partial cross-sectional side view of another type of active acoustic producer (e.g. an AVA assembly) which may be used in the hybrid active-passive system.

DETAILED DESCRIPTION OF THE PREFERRED EMBODIMENTS

Figure 1A:
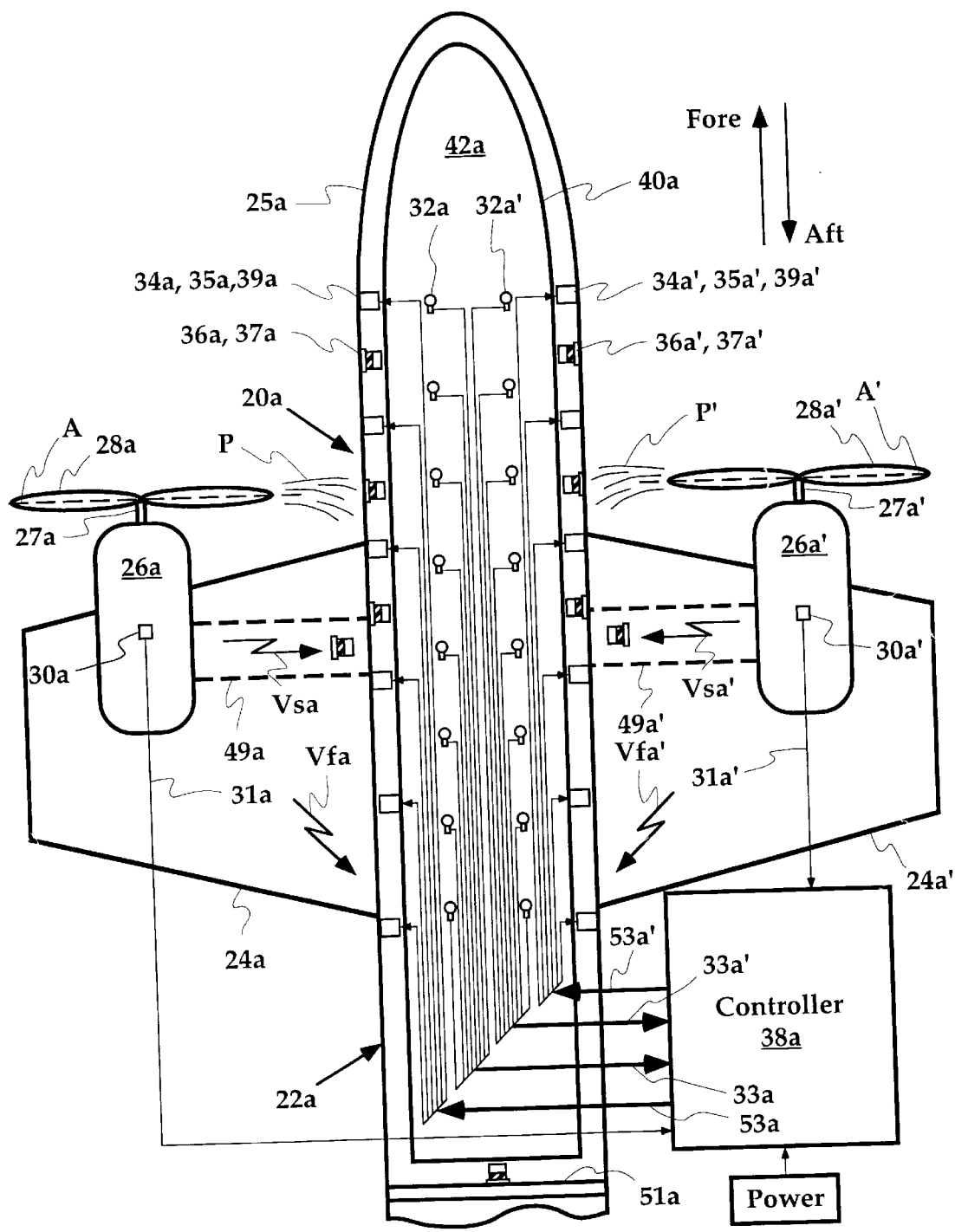
FIG. 1a is a partial cross-sectional top view of a turboprop aircraft illustrating one embodiment of the present invention hybrid active-passive system.

The present invention will be described with reference to the attached drawings wherein like numerals denote like elements when comparing the various embodiments detailed herein. Now referring to Fig. 1a, the hybrid active-passive system 20a is shown its preferred environment of a vehicle, such as an aircraft 22a, or the like. The invention finds particular applicability for cancelling both noise and vibration within propeller-driven aircraft, such as the turboprop (ATP) aircraft shown, but also may be useful for reducing noise and vibration in turbofan aircraft (Fig. 1b) and helicopters (Fig. 1c) or in other aircraft.

Again referring to Fig. 1a, the aircraft 22a comprises a fuselage wall 25a which generally defines a passenger compartment 42a located therewithin. Wings 24a, 24a' attach to fuselage wall 25a with the power plants 26a, 26a' being secured to wings 24a, 24a'. Rotating propeller units 28a, 28a' (which may include, for example, 4 propeller blades each) attach to rotating shafts 27a, 27a' of power plants 26a, 26a'. The rotation of propeller units 28a, 28a' and vibration of power plants 26a, 26a' cause:

1) aerodynamic propeller wash P, P' to aerodynamically impinge upon the fuselage wall 25a generally in a position along the dotted lines denoted A, A' or aft somewhat thereof if the aircraft is flying, and in this embodiment, to a lesser degree, and 2) structural-borne vibration Vsa, Vsa', Vfa, Vfa' (indicated by arrows) to be transmitted through the wings 24a, 24a' or other flanking paths or through internal structural supports 49a, 49a' and into the fuselage wall 25a.

It should be understood, that the disturbance (noise and vibration) which the fuselage wall 25a is exposed to, and which is experienced by the passengers seated therein, has structural-borne contributions from vibration of the power plants 26a, 26a', aerodynamically-induced vibrations caused by the impingement of the propeller wash P, P' on the fuselage wall 25a, and acoustic noise emerging within the compartment 42a that may be the result of both those structure-borne power plant vibrations and aerodynamically-induced vibrations of the fuselage wall 25a due to prop wash P, P'. Therefore, an efficient and lower-cost system is needed that will effectively cancel both structure-borne vibration and acoustic noise within the passenger compartment. The hybrid active-passive system 20a described herein provides this solution and finds equal applicability for reducing both noise and vibration within any vehicle passenger compartment.

In more detail, the hybrid system 20a is comprised of reference signal generating means, preferably including at least one reference sensor, and in this embodiment, including two reference sensors 30a, 30a', for generating a signal representative of the frequency, phase, and/or magnitude of the rotation or vibration of the at least one disturbance source, which is in this embodiment, the two power plants 26a, 26a'. These reference sensors 30a, 30a' may be accelerometers for sensing vibration (acceleration), but preferably are tachometers for sensing rotational speed of each of the two power plants 26a, 26a'. In addition, the input signals provided in input cables 31a, 31a' may be multiplied up by a factor representative of the number of propeller blades (e.g. 3, 4 or 5) of propeller units 28a, 28a' attached to shafts 27a, 27a' to provide a signal to the controller 38a representative of the blade passage frequency of the propeller wash P, P' impinging on the fuselage wall 25a. For clarity, the various conditioners (amps, filters, PLLs, etc.) are not shown in some of the embodiments described herein. It should be understood that any known input, output, and error signal conditioning may be used for each of the hybrid systems described herein that is known to those of ordinary skill in the art.

For turboprop aircraft (otherwise referred to as ATP aircraft) applications, the prop wash P, P' impinging on both sides of the fuselage wall 25a at the blade passage frequency is the predominant acoustic noise generator within the compartment (passenger cabin) 42a as well as the predominant generator of structure-borne vibration within the fuselage wall 25a. In the turboprop aircraft, acoustic noise tones will generally emerge within the compartment 42a at the primary blade passage frequency 4P, 4P' (the fundamental disturbance frequencies for four-bladed propeller systems), 8P, 8P' (the second harmonic frequency) and 12P, 12P' (the third harmonic frequency), where P, P' refers to the fundamental frequency of rotation of each of the power plants 26a, 26a'. Structure-borne vibrations of the fuselage wall 25a will also be present at the fundamental and harmonics (4P, 4P', 8P, 8P', and 12P, 12P' frequencies). Likewise, structure-borne vibration Vsa, Vsa' at the engine frequency (e.g. 1P, 1P') and the blade passage frequency and harmonics (e.g. 4P, 4P', 8P, 8P' and 12P, 12P') may be transmitted directly to the fuselage wall 25a through a structural support 49a, 49a', such as the spar shown or through some flanking path Vfa, Vfa' such as through the wing skins, or the like.

The hybrid active-passive system 20a includes a plurality of passive resonant devices, such as the TVAs 36a, 36a' or TVA assemblies 37a, 37a' and a plurality of active acoustic producers, such as AVAs 34a, 34a', AVA assemblies 39a, 39a', or speakers 35a, 35a'. The TVAs 36a, 36a' or TVA assemblies 37a, 37a' may be attached to the structural supports 49a, 49a', fuselage wall 25a, trim 40a, floor 61d (FIG. d), bulkheads 51a, or the like. Broadly, the TVAs 36a, 36a' or TVA assemblies 37a, 37a' are preferably attached to the support structure or to the fuselage. The term fuselage, as used herein, shall refer to the fuselage wall itself and any member located inside the confines of the fuselage wall (e.g. the trim, the seats, the bulkheads, luggage compartments, and the floors).

The placement of active acoustic producers and passive resonant devices is determined by vibration and acoustic analysis of the structure, fuselage, and compartment. In general, a vibration analysis of the structure and fuselage, is performed by placing accelerometers about the structure and fuselage for determining the operational deflection shapes of the structure, i.e., the points of high and low vibration, etc. and the location of nodes and antinodes. Generally, these deflection shapes are nonsymmetrical, contrary to most analysis. The plurality of passive resonant devices, such as TVAs or TVA assemblies 36a, 36a', 37a, 37a' are preferably placed at the following locations:

1) Where antinode points (hot spots) exist, i.e., points of highest mechanical vibration, and in particular, where the vibration would be an annoyance to the passenger (cause passenger discomfort) or where the vibration may provide potential for fatigue of the airframe. Examples include attaching the TVAs or TVA assemblies 36a, 36a', 37a, 37a' to the floor structure underneath the feet of the passenger, adjacent to the chair rails, to the chair directly, or to the side walls of the fuselage or trim.

2) Generally, the plurality of passive resonant devices would be placed in locations where either the vibration of the structure is not strongly coupled to the acoustic space (the passenger compartment 42a), or where their placement would only decrease noise. In other words, the plurality of passive resonant devices would be placed only where there would be:

a) no adverse effect on the interior noise level, i.e., attached at antinodes of deflection shapes that don't radiate well, or b) a reduction in interior noise pressure levels.

3) As a general rule, the plurality of passive resonant devices would be used to control a first frequency vibration and/or acoustic tone(s) and active acoustic producers (AVAs, AVA assemblies or speakers) would be used for control of a second frequency of vibrations or noise (acoustic tones). Examples include tuning the plurality of passive resonant devices to absorb a blade passage frequency (e.g. 4P) vibration and using the active acoustic producers to control harmonic tones related to the blade passage frequency (e.g. 8p and 12P acoustic tones) in a turboprop aircraft. Another example is control of higher frequency vibration (around 640 hz) with a plurality of passive resonant devices and active acoustic producers, such as loudspeakers, for controlling a plurality of lower frequency tones (as many as about 15 tones from about 50–300 hz).

4) The plurality of passive resonant devices would be placed directly in line with a dominant energy path between the source of disturbance (the power plants 26a, 26a') and the fuselage wall 25a. Examples include placement on the structural support 49, 49a' which is attached between the engine and the fuselage wall.

The plurality of active acoustic producers are preferably placed at the following locations.

1) Active acoustic producers are placed at antinodes of deflection shapes of vibration that are strongly coupled to the acoustic space. Such deflection shapes and locations of antinodes would be determined via an optimization routine and after sufficient collection of data, and preferably after the TVAs have been already fitted to the structure and fuselage. The deflection shapes and locations may be determined by exciting the fuselage wall 25a with acoustic noise, localized vibration, or the like.

2) Active acoustic producers are placed in positions to control interior noise resulting from flanking paths, i.e., non-direct or un-accounted for energy transmission paths. Examples include areas where the wing skin intersects the fuselage wall 25a.

The plurality of active acoustic producers 34a, 35a, 39a (AVAs, speakers, or AVA assemblies) are controlled (dynamically driven) via a plurality of electrical control signals (output signals) provided within output cables 53a, 53a' which are derived via digital signal processing taking place within controller 38a. The at least one reference signal, and preferably two reference signals, in input cables 31a, 31a' and plurality of error signals provided by error sensor banks 32a, 32a' in error cables 33a, 33a' are provided to the controller 38a.

The controller 38a preferably includes a DSP, memory (RAM and ROM), the appropriate sampling clocks, Digital-to-Analog and Analog-to-Digital converters, and input/output processing components (PLLs, amplifiers, low pass, high pass, and band pass filters) as are well known to those of ordinary skill in the art. The plurality of control signals in output cables 53a, 53a' are produced via an adaptive filtering process and drive the plurality of active acoustic producers, such as AVAs 34a, 34a', AVA assemblies 39a, 39a', loudspeakers 35a, 35a', or combinations thereof, for generating the canceling acoustic noise (anti-noise) within the passenger compartment 42a. Generally, the controller adapts the control filters in order to minimize the error signals, as will be described further with reference to FIG. 2a. The error sensors 32a, 32a' are generally microphones and are placed as close as possible to where the attenuation is required. Preferably, the error sensors 32a, 32a' are placed at, or near, the passengers head level.

Figure 1B:
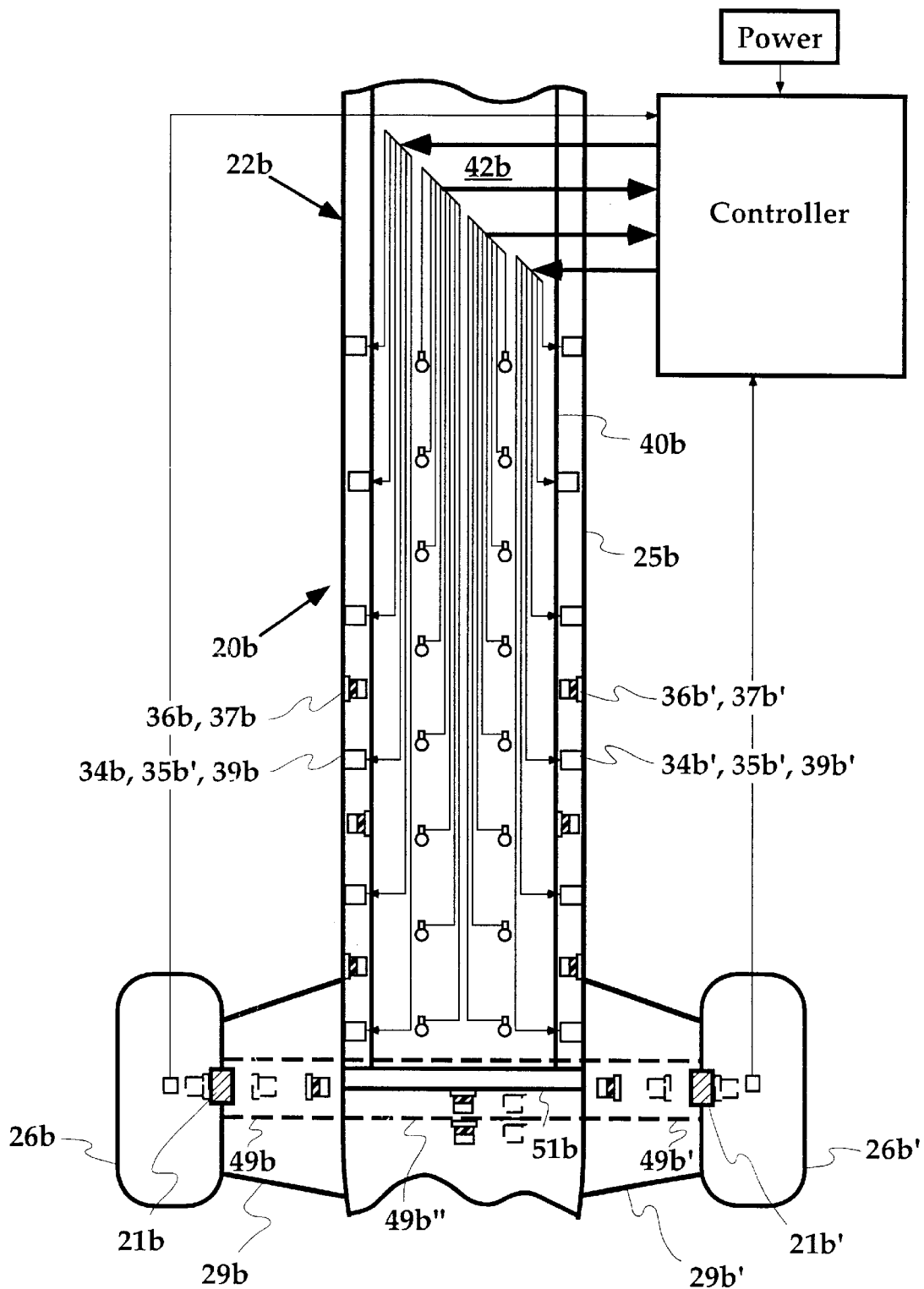
FIG. 1b is a partial cross-sectional top view of a turbofan aircraft illustrating another embodiment of the hybrid active-passive system.

FIG. 1b illustrates another embodiment of hybrid active-passive system 20b. This system is similar to the FIG. 1a embodiment, but is shown in the environment of a turbofan aircraft 22b including multiple aft-mounted turbofan power plants 26b, 26b' indirectly secured to fuselage wall 25b via somewhat-flexible pylon members 29b, 29b'. Included within pylon members 29b, 29b' are structural supports 49b, 49b' (spars) which comprise the main load path and structural support for the power plants 26b, 26b'. The structural supports 49b, 49b' may also be interconnected by a structural cross member 49b". The passive resonant devices, such as passive TVAs 36b, 36b' or TVA assemblies 37b, 37b', preferably attach, at various spaced-apart locations, to the fuselage wall 25a as in the previous case. However, instead of being placed predominantly adjacent the area of prop wash as in the turboprop aircraft, they are generally placed in positions adjacent the power plants 26b, 26b'. Generally, they would be placed within about a ¼ wavelength of the entry point of the dominant energy path, in this case, within a ¼ wavelength of the intersection of the structural support 49b and the fuselage wall 25a. Likewise, passive resonant devices may be placed elsewhere on the fuselage, such as to the trim 40b, the floor, or to the bulkhead 51b to absorb vibration and/or control noise. Passive resonant devices may also be placed directly on the dominant energy path, i.e., on the structural supports 49b, 49b', or on a structural cross member 49b".

The active acoustic generators, such as AVAs 34b, 34b', AVA assemblies 39b, 39b' or loudspeakers 35b, 35b' may be placed on the interior of the fuselage wall 25b or alternatively, to trim 40b or bulkhead 51b to produce acoustic anti-noise (180° degrees out of phase with the input signals) within the compartment 42b to destructively interfere with the noise generated by the disturbance sources (power plants 26b, 26b') within the compartment 42b. Alternatively, the AVAs 34b, 34b' or AVA assemblies 39b, 39b' may be placed on the structural supports 49b, 49b' intermediate the power plants and the fuselage wall 25b, the structural cross member 49b", or attached to active mounts 21b, 21b'. The cables in each of these optional locations have been deleted for clarity. Active mounts 21b, 21b', if used, support the static loads and provide motion accommodation by the power plants 26b, 26b' yet isolate vibrations emanating therefrom. Active elements attached to mounts 21b, 21b', may be vibrated to augment the passive isolation due to flexible elements within the mounts 21b, 21b'. A description of active mounts may be found in U.S. Pat. No. 5,551,650 to Southward et al. entitled "Active Mounts for Aircraft Engines" and in U.S. Pat. No. 5,526,292 to Hodgson et al. entitled "Broadband Noise and Vibration Reduction" and in WO 96/12121 entitled "Active Systems and Devices Including Active Vibration Absorbers (AVAs)."

FIG. 1c illustrates the hybrid active-passive system 20c implemented in an aircraft such as a helicopter 22c. The helicopter 22c is comprised of a passenger compartment 42c, a fuselage wall 25c at least partially defining the compartment 42c, interior trim 40c fastened to the fuselage wall 25c and fore and aft bulkheads 51c, 51c'. The engine 26c (only one of which is shown, but there may be two) generates the motive power to rotationally drive the main rotor 28m and the tail rotor 28t via an intermediate gearbox 57c. The gearbox 57c is preferably mounted relative to the fuselage wall 25c with passive mounts 75c, however it may be hard-mounted as well.

The helicopter noise and vibration problems to be solved include:

1) main rotor wash Pm causing low frequency vibration of the fuselage 25c (approx. 12 hz (2P) in this embodiment which includes a two-bladed main rotor 28m) and harmonic noise (such as harmonics of the blade passage frequency (e.g. 4P, 5P, 6P, etc.) which emerge within the compartment 42c, 2) tail rotor wash Pt causing higher frequency noise (some multiple of the main rotor rotation frequency dependent upon the gearing and number of tail rotor blades) within the compartment 42c and structure-borne vibration of the tail boom 59c and of the fuselage wall 25c, 3) acoustic noise generated within the compartment 42c and structure-borne vibration of the fuselage wall 25c from power plant 26c which may be at an N1 frequency (the fan frequency) or an N2 frequency (the compressor frequency), and 4) higher frequency gear noise (approx. 500–900 hz) generated within the compartment 42c and structure-borne vibration of the fuselage wall 25c from meshing of gear teeth of gearbox 57c that emerges at a frequency Fg (the gear mesh frequency). This gear noise may include gear sideband frequencies and harmonics above and below Fg as well.

Figure 1F:
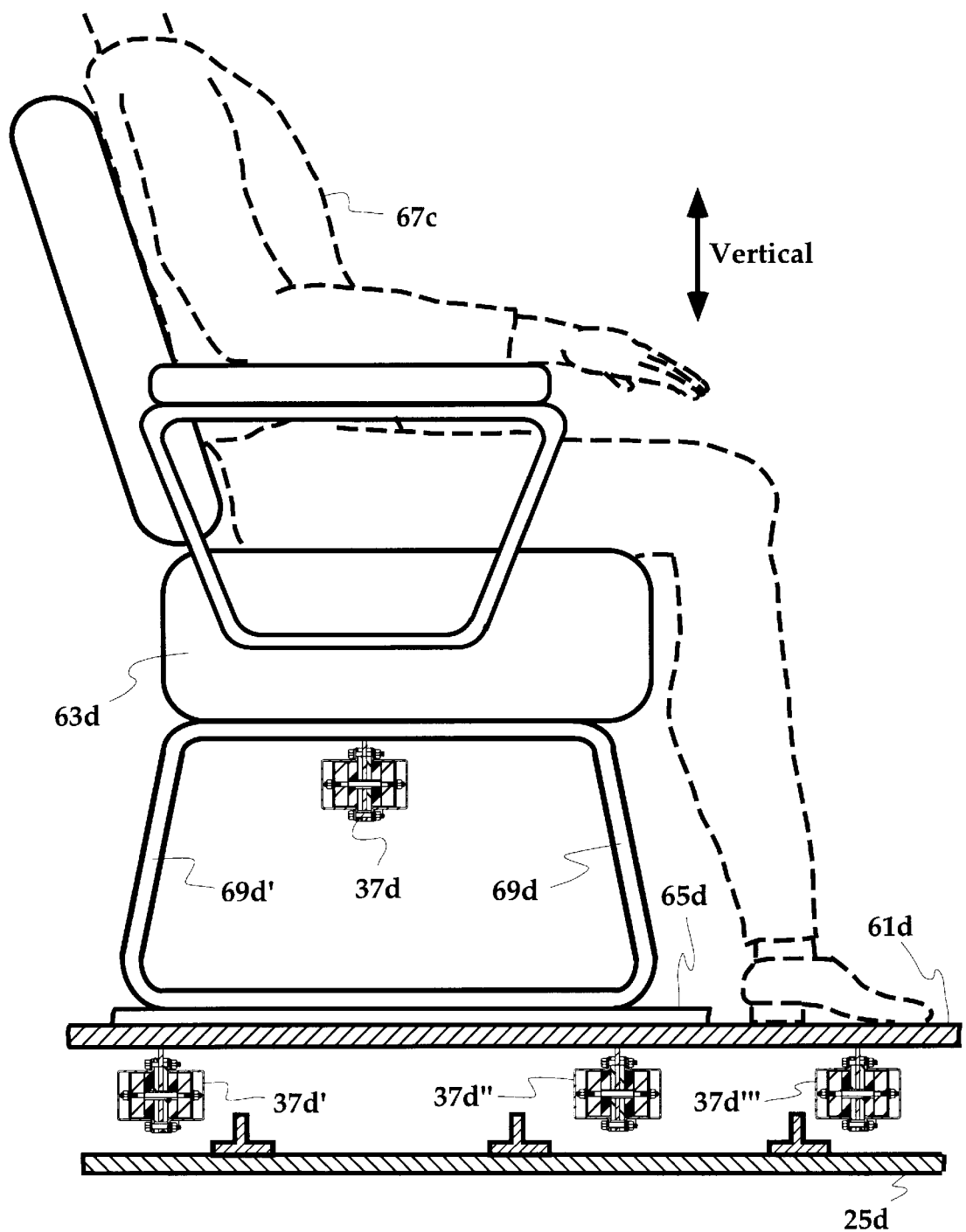
FIG. 1f is a partial cross-sectional side view of a passenger seat illustrating preferred locations of passive resonant devices of the hybrid active-passive system.

The reference sensor 30c providing a signal indicative of the speed of the power plant 26c would generally be providing the synchronizing signal to the controller 38b and to the adaptive feedforward control process. Optionally, a reference sensor 30c' on the gearbox 57c, reference sensor 30c" exposed to the main rotor wash Pm, or a sensor 30c''' exposed to the tail rotor wash Pt, may be used to derive the reference signal. Optionally, sensor 30c''' may be placed upon the tail rotor gear box assembly. The hybrid system 20c employs a plurality of passive resonant devices, such as TVAs or TVA assemblies 36c, 37c attached at various locations. This may include attachment to the fuselage, such as to the fuselage wall 25c, to the trim 40c, to the bulkheads 51c, 51c' to the floor 61c, adjacent to the seats 63c, 63c' or seat rails 65d (FIG. 1f), or underneath the passengers feet. Likewise, the TVAs or TVA assemblies 36c, 37c may attach directly in line with a dominant energy path, such as to the structural support 49c within boom 59c to control structure-borne vibration Vsc of the tail boom 59c or to any direct interconnection between the fuselage 25c and gearbox 57c.

For example, as shown in FIG. 1c, a TVA or TVA assembly 36c', '37c' may be attached to one or more of the linkages 79c', 79c" (generally there are four, of which only two are shown) to help absorb high frequency vibrations associated with the gearbox (e.g. gear mesh frequencies) and prevent that predominant vibration from being transmitted along the axes of the linkages 79c', 79c" and into the fuselage 25c'. The linkages 79c', 79c" are part of a nodal beam gearbox mount assembly 75c' which mounts the transmission 57c' to the fuselage 25c'. The nodal beam gearbox mount assembly 75c' itself is a passive resonant device and includes brackets 83c', 83c" (located at the position of the forced nodes) for attaching the assembly 75c' to the fuselage 25c', first and second nodal beams 84c', 84c" pivotally interconnect to brackets 83c', 83c" near the ends thereof. The linkages 79c', 79c" also attach to the first and second nodal beams 84c', 84c" at a position somewhat inboard from the beam/bracket pivot point. Leaf spring 85c' interconnects the nodal beams 84c', 84c" and is of the proper spring stiffness to provide nodes at the location of brackets 83c', 83c". The stiffness of leaf spring 85c', positioning of the linkages 79c', 79c", length of nodal beams 84c', 84c" and positions of brackets 83c', 83c" are adjusted such that the nodes occur adjacent to the attachment points of the brackets 83c', 83c" to the fuselage 25c'. This generally reduces vibration transmission at the nodal frequency which is the predominant blade passage frequency (generally 2P). In combination therewith, active acoustic generators, such as AVAs or other active force producing devices, may be attached adjacent to the beams 84c', 84c" as are AVAs 34c', adjacent to brackets 83c', 83c" as are AVAs 34c", or to the fuselage 25c' as are AVAs 34c'''. The hybrid system controls the predominant blade passage vibrations and high frequency vibration (such as gear noise) causing high frequency noise within the compartment.

FIG. 1e" illustrates one of the links 79c' described with reference to FIG. 1d. The link 79c' includes a first end 86c' for attachment to the beam 83c' and a second end 86c" for attaching to the transmission 57c'. The link 79c' includes a passive resonant device, such as a TVA or TVA assembly 36c, 37c attached thereon. The TVA includes a mass 58c' and a flexible member 62c' which are tuned such that the TVA's axial resonant frequency substantially coincides with a predominant vibration frequency (e.g. 2P, gear noise, etc.) thereby absorbing vibration at the tuned frequency.

Again referring to FIG. 1c, a plurality of acoustic producers generate the cancelling acoustic noise within the compartment 42c. In this embodiment, AVAs or AVAs assemblies 34c, 39c are preferably attached adjacent the fuselage wall 25c and underneath the gearbox to control high-frequency gear noise. Optionally, or additionally, a plurality of speakers 35c may be positioned within the compartment such as underneath seats or near the passengers' heads to cancel lower-frequency noise, such as the noise produced by prop wash Pm or other higher harmonics (4P, 8P, 12P, etc.) and/or somewhat higher frequency noise produced by tail rotor wash Pt. A plurality of error sensors 32c placed strategically within the compartment measure and provide signals indicative of the residual acoustic noise within the compartment 42c. The controller 38b processes the at least one reference signal and plurality of error signals according to an adaptive update method to update the weights of a plurality of adaptive control filters. The at least one reference signal is also convolved with the adaptive filter (preferably an Finite Impulse Response (FIR) filter) and produces a plurality of drive (output) signals to drive the plurality of active acoustic producers 34c, 35c, 39c.

FIG. 1d illustrates several preferred locations of passive resonant devices, such as the TVA assemblies 37d, 37d', 37d", 37d''' shown. It should be understood that, alternatively, single TVAs could be placed in these locations. The assemblies 37d, 37d', 37d", 37d''' are preferably placed in one or more locations to absorb vibrations experienced by the passenger 67c. The TVA assemblies 37d, 37d', 37d", 37d''' may be placed underneath the seat 63d, as is TVA assembly 37d in the appropriate position to effectuate a vibration reduction to the passenger 67c, between the floor 61d and fuselage wall 25d adjacent to the passengers feet locations, as is TVA assembly 37d''', or adjacent to the chair rails 65d adjacent to the position where the seat uprights 69d, 69d'''\ connect thereto, as are TVA assemblies 37d', 37d". All of the above-mentioned TVA assemblies 37d, 37d', 37d", 37d''' are preferably oriented such that they produce absorbing forces in the vertical or lateral (into and out of the paper) directions.

Figure 1G:
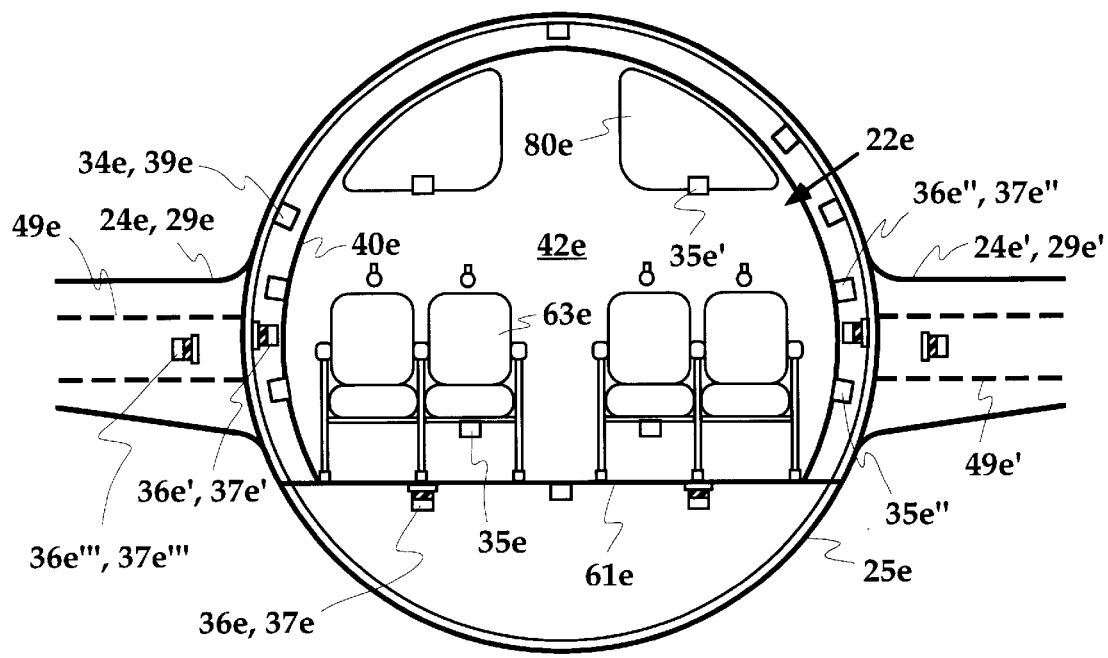
FIG. 1g is a partial cross-sectional aft-looking view of an aircraft (either turbofan or turboprop) illustrating the preferred locations of passive resonant devices and active acoustic producers of the hybrid active-passive system.

FIG. 1g illustrates a cross-sectional view of an aircraft 22e which represents either a turboprop or turbofan which includes wings 24e, 24e' attached to a fuselage wall 25e or with pylons 29e, 29e' attached to the aft fuselage wall 25e. The positioning of active acoustic producers, such as AVAs or AVA assemblies 34e, 39e are such that they are spaced about the compartment 42e preferably substantially located at the antinodes of the deflection shapes where dynamically driving the active acoustic producers will efficiently produce canceling noise within the compartment 42e. Alternatively, speakers 35e, 35e', 35e'', may be used and placed throughout the compartment 42e, such as under the seats 63e as is speaker 35e, attached to the overhead luggage compartment 80e as is speaker 35e', or attached to the trim 40e as is speaker 35e'' to control compartment acoustics. Alternatively, combinations of loudspeakers and AVA/AVA assemblies may be used. The AVA/AVA assemblies may be used to control acoustic noise which is strongly coupled to the compartment acoustics and speakers 35e, 35e', 35e'' may be used to control acoustics which are uncoupled to the vibration deflection shapes of the fuselage wall 25e. The passive resonant devices are shown attached to the fuselage, such as to the floor 61e in the vicinity of the passengers feet as in TVA/TVA Assembly 36e, 37e, to the side walls as in TVA/TVA Assembly 36e', 37e', or attached to the trim adjacent where the passenger may come into contact therewith. Likewise, the passive resonant devices may be attached to the structural supports 49e, 49e' as in TVA/TVA Assembly 36e'', 37e''.

Figures 1H, 1J:
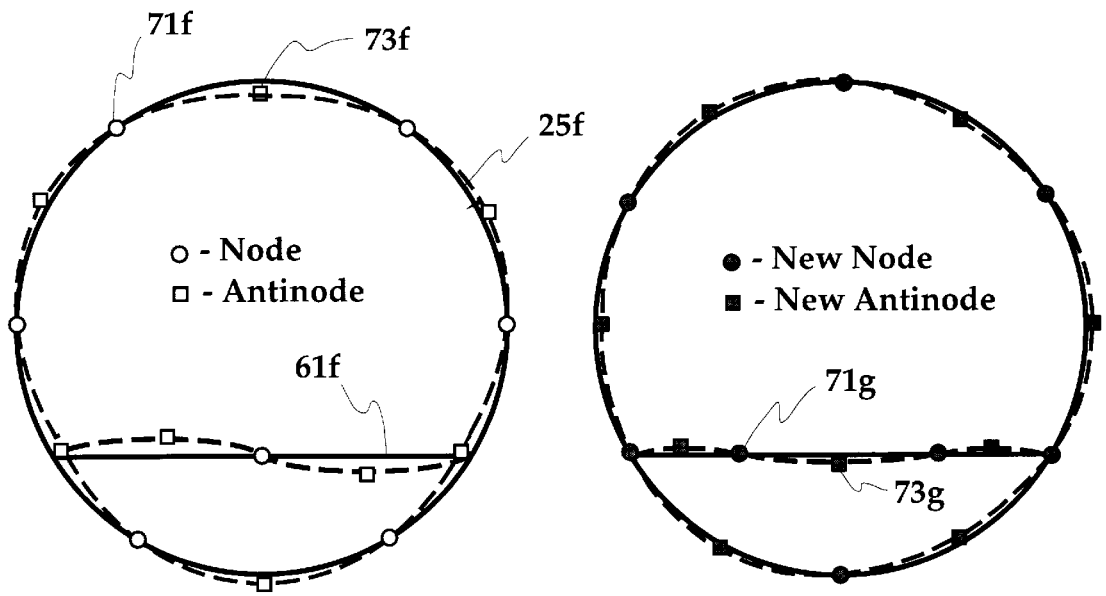
FIG. 1h is a schematic aft-looking view illustrating the simulated predominant vibrational deflection shapes (including nodes and antinodes) of the aircraft fuselage wall and floor.
FIG. 1j is a schematic aft-looking view illustrating the predominant new vibrational deflection shapes (including new nodes and antinodes) after placement of the passive resonant devices on the fuselage and floor.

FIG. 1h illustrates a simulation of the deflection shapes of the fuselage illustrating the position of the nodes 71f (designated with circles) and antinodes 73f (designated with squares) of a simulated fuselage (including fuselage wall 25f and floor 61f). Passive resonant devices would be placed adjacent the antinodes 73f. Placing a TVA or TVA assembly, for example, at the antinode 73f will alter the deflection shapes and generally produce new nodes 71g (FIG. 1j) substantially adjacent to the attachment point thereof. The AVAs or other active inertial devices would then be placed at the position of the new antinodes 73g. The new deflection shape configuration would be approximately as shown in FIG. 1g after the placement of the TVAs where some amount of the vibrational energy will have been absorbed by the absorbers at their tuned frequency, thus, resulting in deflection shapes with less magnitude at the new antinodes 73g. Notably, real deflection shapes will generally be nonsymmetrical and, therefore, will result in TVA and AVA placement locations which are also asymmetrical.

An alternate methodology would be to add the AVAs or other active inertial devices at the positions of the antinodes of the original deflection shapes of the fuselage and thereafter place passive resonant devices, such as TVAs in the positions where the vibration was made worse, and particularly, in the areas where the vibration can be experienced by the passengers.

Figure 2A:
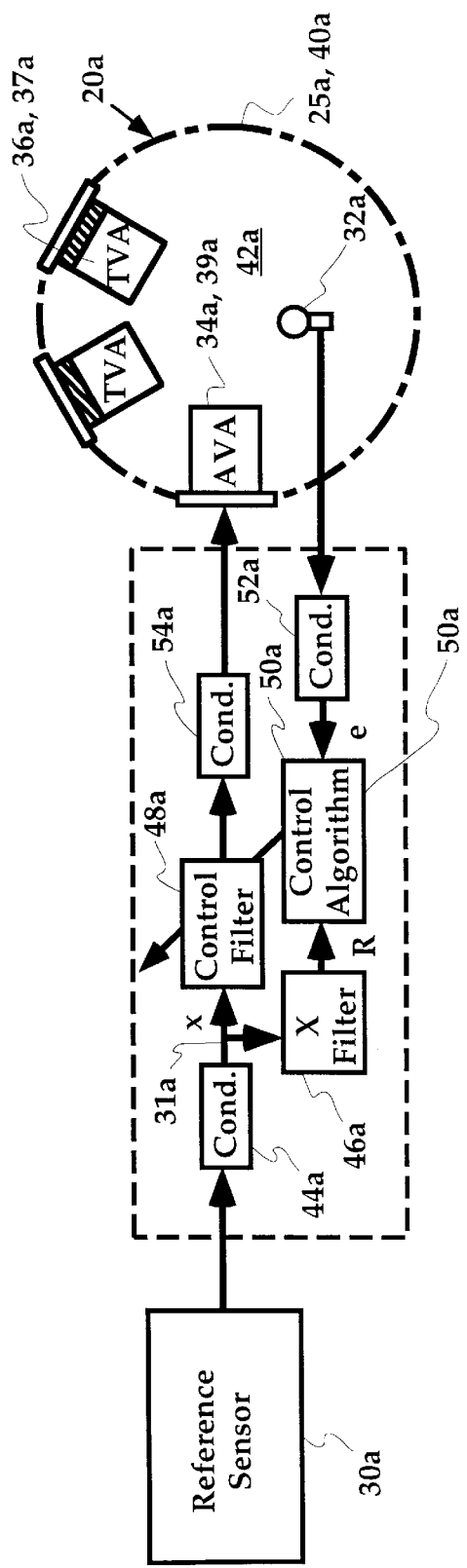
FIG. 2a is a block diagram illustrating the controller components of one embodiment of the hybrid active-passive system.

FIG. 2a illustrates a block diagram of an embodiment of hybrid system 20a including reference signal generating means including at least one reference sensor 30a for providing a signal indicative of (correlated to) the vibration or rotational speed of the first power plant 26a (FIG. 1a) (a first one of the at least one disturbance source). Conditioner 44a provides a conditioned and generally noise-free signal indicative of one or more dominant vibrations or speeds of the power plant 26a. For example, the dominant engine speeds may be N1 (the fan speed) and/or N2 (the compressor speed) of the power plant 26a, the frequency of the blade pass harmonics (e.g. 4P, 8P, 12P, etc.), or in the case of a helicopter, the main rotor frequency (e.g. 2P) or harmonics thereof, the tail rotor blade passage frequency, or the gear noise (rotation, mesh, side bands, or harmonic) frequencies.

Figure 2B:
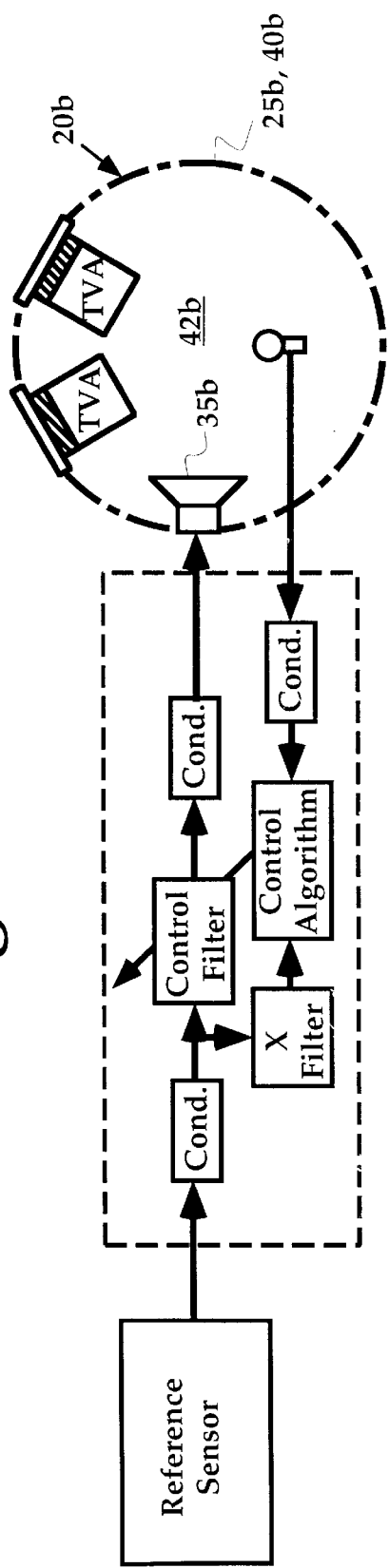
FIG. 2b is a block diagram illustrating the components of another embodiment of the hybrid active-passive system.

Conditioner 44a may include a band pass filter, low pass filters, high pass filters, amplifiers, Analog-To-Digital Converters and/or a Phase Locked Loop (PLL) for conditioning the at least one reference signal and providing an appropriate input signal to adaptive control filter 48a. The input signal 31a designated as x is input directly to the x-filter 46a to provide the output R which is used by the control algorithm in the update block 50a for updating the filter coefficients (weights) of the adaptive control filter 48a. The x-filter 46a represents a model of the dynamics between the AVAs 34a and the plurality of error sensors 32a. This model may be determined on-line or off-line and may be updated periodically. The preferable algorithm is the Filtered-x Least Means Square (F-x LMS) control algorithm, as is well known to those of skill in the art. Error signal information e from the plurality of error microphones 32a within compartment 42a are conditioned via error conditioning 52a and provided to the update block 50a to be used in the update of the weights of plurality of control filters 48a. The input signal x is convolved with each of the plurality of control filter 48a to derive a plurality of output signals y to output conditioners 54a to produce the appropriate signals to drive the AVAs or AVA assemblies 34a, 39a. Output conditioning 54a may include low pass filters, high pass filters, band pass filters, amplifiers, Digital-To-Analog converters or other means for conditioning the output signal y. Each of the lines interconnecting the various blocks in FIG. 2a and FIG. 2b are illustrated as "bolded" to indicate that the hybrid active passive systems 20a, 20b are Multiple Input Multiple Output (MIMO) systems, therefore, there may be multiple reference signals indicative of multiple disturbance sources or representative of multiple harmonics (such as 2P, 4P, 8P, 12P) or non-harmonically related tones (such as N1 and N2). Likewise, there are multiple error signals from the plurality of error sensors 32a, a signal from each of which is provided to the update block 50a to update the weights of the plurality of control filters 48a, of which there are multiples of. In the MIMO case, there would be L x N x M X O number of control filters, where L is the number of power plants or disturbance sources from which a signal indicative is provided, N is the number of acoustic producers (speakers or AVA/AVA pairs), M is the number of error sensors, and O is the number of tones or harmonics being controlled per disturbance source. A plurality of TVAs 36a, 37a are attached to the fuselage wall 25a, the trim 40a, or other fuselage or structural support members interconnected to the fuselage wall 25a.

FIG. 2b illustrates a block diagram of another embodiment of a hybrid system 20b which is similar to that of FIG. 2a except that the active acoustic producer are a plurality of loudspeakers 35b which may be attached to the fuselage wall 25b or elsewhere within the compartment 42b such as to the trim 40b or other interior components within the compartment 42b.

FIG. 3 illustrates one embodiment of a passive TVA assembly 37 including preferably matched single TVAs 36, 36' installed on either side of a stiffening member 56 of an aircraft's fuselage wall 25a (FIG. 1a). Each TVA 36, 36' in TVA assembly 37 is comprised of a tuning mass 58, 58', a base 60, 60', and a flexible member 62, 62' flexibly connecting the bases 60, 60' and tuning masses 58, 58' together. The flexible member 62, 62' is preferably silicone elastomer which is preferably bonded, through known bonding processes, to the bases 60, 60' and tuning masses 58, 58'. The assembly 37 preferably exhibits a transmissibility at resonance of about 12. Upon encountering vibration of the fuselage wall 25a coincident with the tuned frequency of the TVA assembly 37, the masses will resonate and vibrate in pure shear in the radial direction (generally into and out of the paper). A cross connector 64, such as a threaded rod, ensures that the tuning masses 58, 58' will vibrate in unison. Additional masses 66, 66', which are preferably thin discs, may be attached for fine tuning of the resonant frequency of the TVA assembly 37. Covers 68, 68' are placed over the TVAs 36, 36' to prevent any insulation within the space between the fuselage wall 25a and trim 40a (FIG. 1a) from contacting the moving tuning masses 58, 58' which could cause an interruption in their ability to vibrate and absorb vibration. The tuned frequency of the TVA assembly 37 is determined via properly sizing the masses 58, 58' additional masses 66, 66' and/or changing the stiffnesses of flexible members 62, 62'. The tuned frequency is generally approximated by the relationship:

$$fn = \tfrac{1}{2}\pi \, (K/M)^{\tfrac{1}{2}}$$

Where:
fn=natural or resonant frequency (Hz), K=shear stiffness of the flexible members 62, 62' added as parallel springs, and M=the combined mass of the tuning masses 58, 58' and the additional masses 66, 66'.

FIG. 4a illustrates one embodiment of AVA 34a including a casing 70 manufactured from a magnetically soft material, such as steel, a tuning mass 58" which may be a permanent magnet, or the like having north N and south S poles, or the like, which is flexibly suspended relative to the casing 70 by at least one flexible member (spring) and preferably two springs 55a, 55b. A coil 72 of copper wire is wound circumferentially about bobbin 81 and when lead 76 which interconnects to the ends of coil 72 is energized with alternating current, it produces a magnetic field F (approximated by dotted lines shown) which reacts with the static field produced by the permanent magnet mass 58". The magnitude, frequency, and phase of the electrical current to coil 72 may be varied by the controller 38a (FIG. 1a) thereby allowing variations in the magnitude, phase, and frequency of forces generated which drive the tuning mass 58" and cause the fuselage or structural support to vibrate to produce antinoise within the compartment 42a (FIG. 1a). The AVA 34a must be chosen to have sufficient control authority, have the appropriate frequency response, and be fairly linear, as well as exhibiting low harmonic distortion. The casing 70 of the AVA 34a preferably attaches to a bracket 74 by way of bolt-like fasteners 82. The bracket 74 is then secured to a stiffening member 56 (frame) of the fuselage wall 25a, other portions of the fuselage, or to other structural members interconnecting the fuselage wall 25a with the power plants 26a (FIG. 1a). The AVAs 34a are placed upon various frames as a result of determining which locations are most effective at attenuating noise within the passenger compartment. Generally, the AVAs 34a will be placed nonsymmetrically about the fuselage wall 25a.

FIG. 4b illustrates another embodiment of AVA 34, 34' and an embodiment of AVA assembly 39. The AVAs 34, 34' are similar to that described with reference to FIG. 4a, except that they include supplemental tuning masses 41, 41' and supplemental flexible members 43, 43'. This allows each AVA 34, 34' to be tuned to exhibit multiple resonant frequencies, and in particular, a first resonant frequency fn1 and a second resonant frequency fn2. AVA assemblies such as this have been coined Multiple Degree Of Freedom (MDOF) AVAs, as is described in WO 96/12121. Preferably, the supplemental flexible members 43, 43' are elastomeric and bonded between the brackets 74', 74" and plates 45, 45'. Preferably, the AVAs 34, 34' are driven in parallel and are electrically wired to receive the same output signal from the controller. Casings 70', 70" then attach to plates 45, 45' by way of threaded rods and brackets 74', 74", in turn, attach to stiffening member 56 which attaches to fuselage wall 25a. Likewise, the AVA assembly 39 may attach to other portions of the fuselage or to the structural supports between the power plants or gearbox and the fuselage wall.

FIG. 5 illustrates another embodiment of a MDOF AVA assembly 39h. The AVA assembly 39h includes first and second AVAs 34h, 34h' secured to beam-like springs 43h, 43h' and flexibly suspended thereby. Beam-like springs 43h, 43h40 attach to bracket 74h which is secured to stiffening member 56h. Stiffening member 56h is likewise attached to fuselage wall 25h.

Figures 6A, 6B:
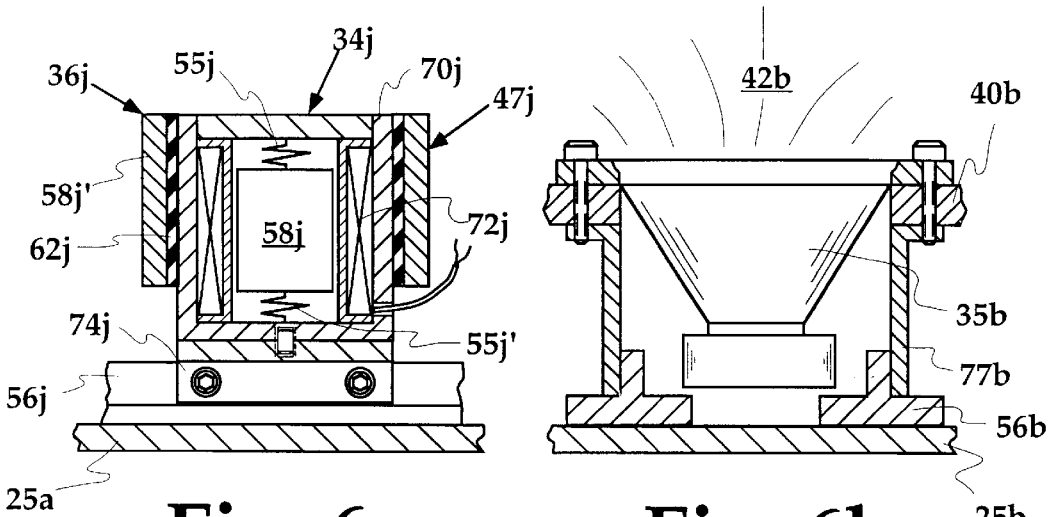
FIG. 6a is a partial cross-sectional side view of an active acoustic producer (e.g. a hybrid device including an AVA with a collocated TVA) which may be used in the hybrid active-passive system.
FIG. 6b is a partial cross-sectional side view of an active acoustic producer (e.g. a loudspeaker) which may be used in the hybrid active-passive system.

FIG. 6a illustrates a device wherein the TVA 36j and AVA 34j are integrated into a single hybrid device 47j thereby allowing collocation of the AVA 34j with TVA 36j where it is advantageous to do so. The hybrid device 47j is comprised of first tuning mass 58j suspended relative to its casing 70j by springs 55j, 55j' and a second tuning mass 58j' suspended relative to the outer periphery of the cylindrical casing 70j by tubular-shaped flexible member 62j. The first tuning mass 58j is dynamically driven by energizing coil 72j to produce active forces. Likewise, the second tuning mass 58j' resonates passively as a result of base vibrations at or near its tuned frequency. Notably, the tuned (resonant) frequency of the TVA 36j is preferably different than the tuned (resonant) frequency of the AVA 34j. It should be understood that although one integrated hybrid device 47j is illustrated, the AVA 34j and TVA 36j operate in a parallel relationship. In other words, driving the AVA 34j at certain frequencies may not cause significant motion of the TVA 36j. Likewise, the TVA 36j may be resonating due to base vibrations when the AVA 34j is not. The hybrid device 47j preferably attaches to fuselage wall 25a via stiffening member 56j or other portions of the fuselage, or to the support structure by way of bracket 74j. One particular application of the hybrid device 47j would be in a turboprop where the TVA portion 36j is tuned to the 4P frequency and the AVA 34j is tuned to 8P or 12P and dynamically driven via output signals from the controller to produce cancelling acoustic noise at 8P and 12P within the passenger compartment. Further, the TVA portion 36j may be tuned to a frequency of structure-borne vibration which is not strongly coupled to the compartment's acoustics and the AVA 34j may be tuned to control structure-borne vibration at frequencies that are strongly coupled to the compartment's acoustics.

FIG. 6b illustrates the attachment of an active acoustic producer, such as a loudspeaker 35b to the trim 40b. The speaker 35b attaches to trim 40b by way of fasteners, or the like and generally projects noise into the compartment 42b. Spacer brackets 77b secure the trim 40b relative to the stiffening member 56b and fuselage wall 25b.

FIG. 7 through FIG. 10 illustrate various performance curve predictions or measurements of sound pressure levels and vibration levels for various systems. An aircraft with just TVAs was tested and the results recorded. Next, the same aircraft including an ASC system was tested and the results recorded. A model of the acoustics in the compartment and vibration of the fuselage was developed. From this, the vibration and acoustics of the hybrid system were predicted. For example, the measured sound pressure level results at 32 different microphone locations are shown for TVAs alone versus the baseline system (with no noise or vibration treatments) in FIG. 7a. The vibration levels for 36 accelerometer locations are shown for the TVAs alone versus the baseline system in FIG. 7b. The vibration levels for 36 accelerometer locations are shown for the ASC system alone versus the baseline system in FIG. 8. The sound pressure level results of the hybrid active-passive system versus the baseline system are shown for 32 microphone positions in FIG. 9a. Finally, the results of vibration levels at 36 accelerometer locations are shown for the Hybrid system versus the baseline system in FIG. 9b.

Figure 7A:
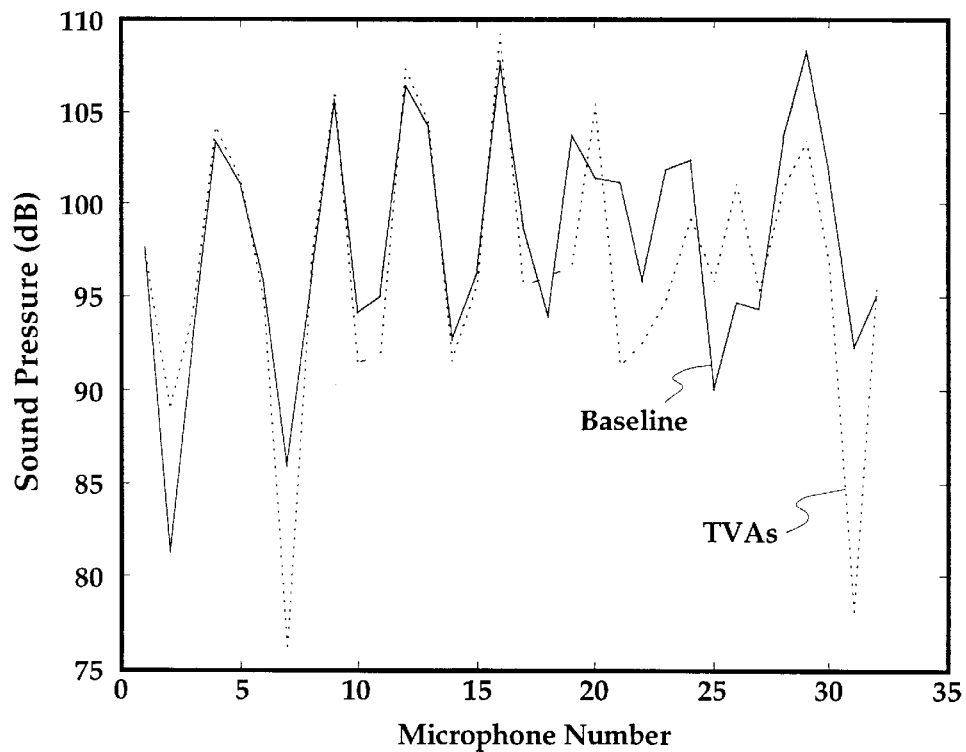
FIG. 7a is a measured performance curve illustrating sound pressure levels with, and without, TVAs attached at various locations spaced about the fuselage wall.
Figure 7B:
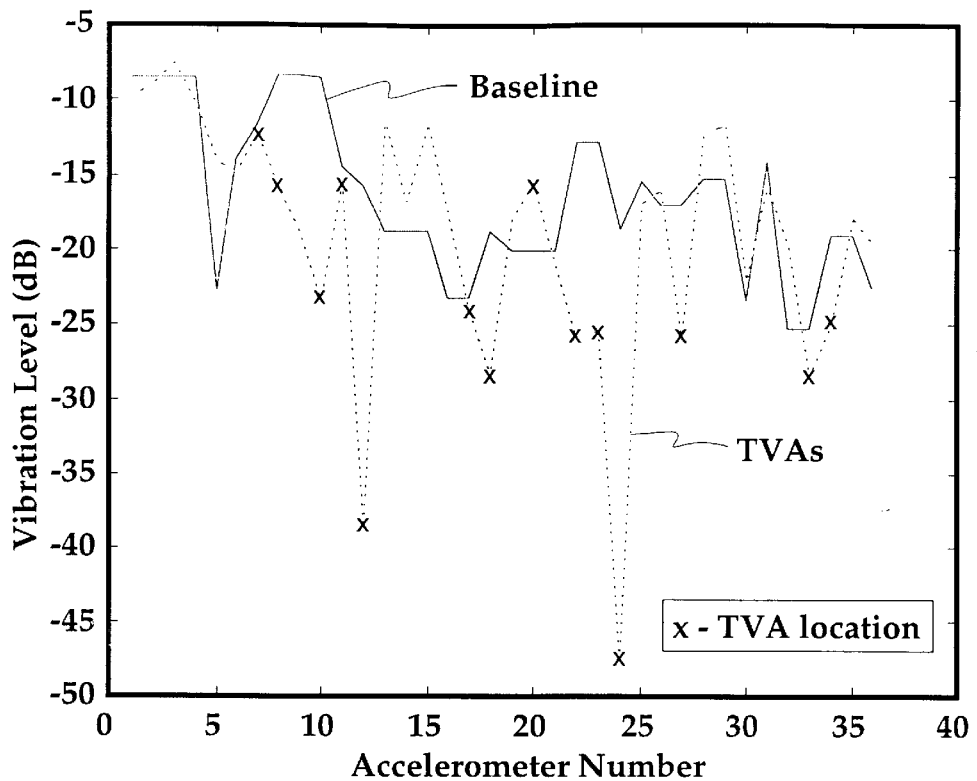
FIG. 7b is a predicted performance curve illustrating vibration levels with, and without, the TVAs installed (x-indicates accelerometer locations with TVAs attached thereat).
Figure 8:
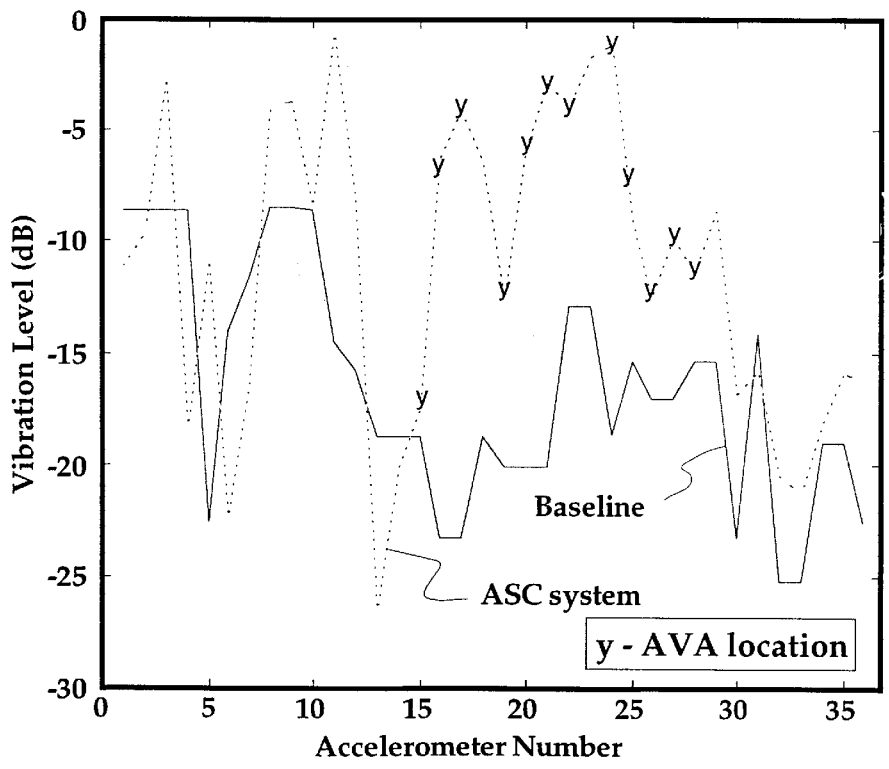
FIG. 8 is a predicted performance curve illustrating vibration levels with, and without, an ASC system attached at various locations spaced about the fuselage wall (y-indicates accelerometer locations with AVAs attached thereat)
Figure 9A:
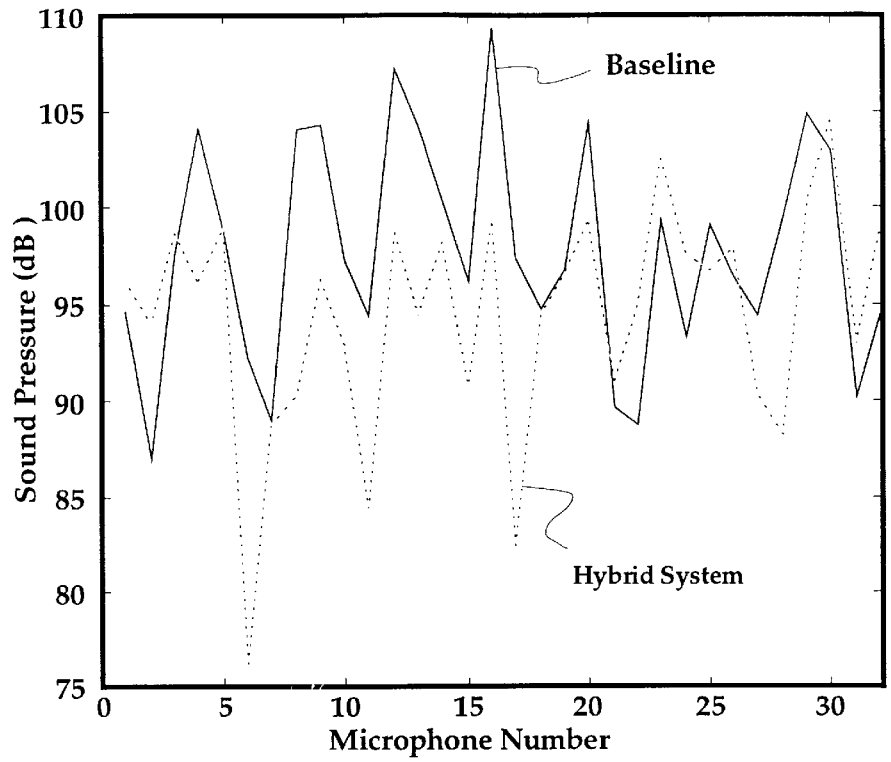
FIG. 9a is a predicted performance curve illustrating sound pressure levels with, and without, the hybrid active-passive system installed.
Figure 9B:
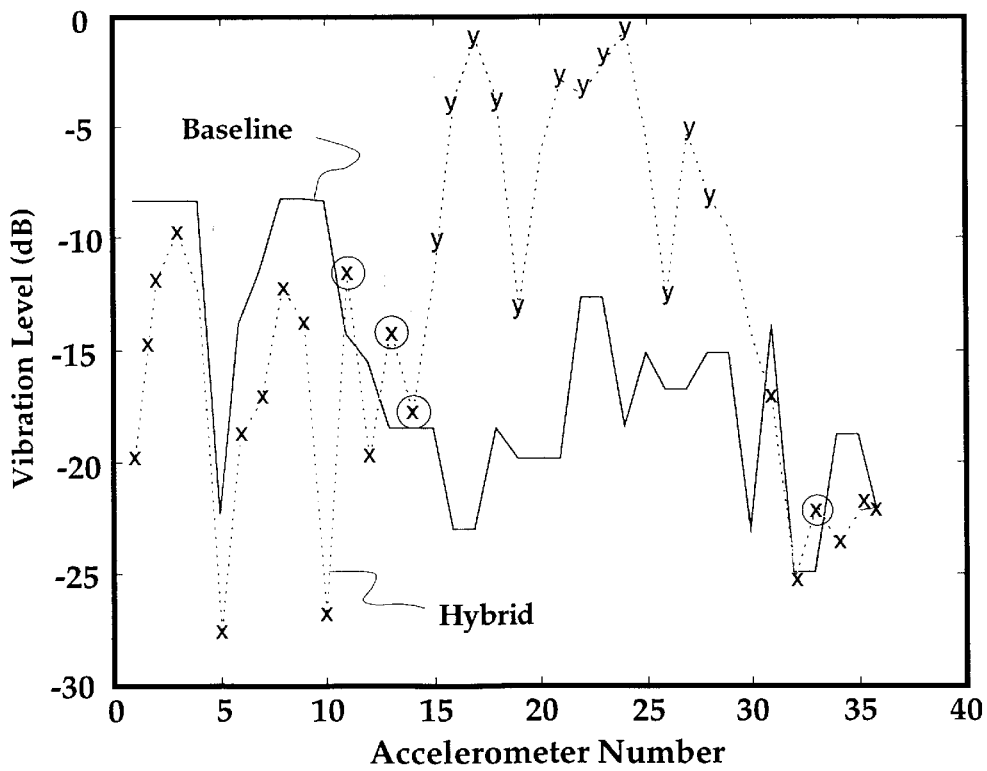
FIG. 9b is a predicted performance curve illustrating vibration levels with, and without, the hybrid system installed (x indicates accelerometer locations with TVAs attached thereat and y indicates accelerometer locations with AVAs attached thereat).

The plot in FIG. 7a illustrates that TVAs will produce some noise reductions at certain microphone locations, for example, at microphone locations 7, 10, 11, 14, 16, 19, 21–24, and 28–32. The plot in FIG. 7b illustrates that TVAs will produce vibration reductions at certain accelerometer locations, for example, at the accelerometer locations marked with an x which correspond to locations where the TVAs are placed. FIG. 8 illustrates the ASC system including twelve AVAs attached to the fuselage wall at various spaced-apart generally nonsymmetrical locations for vibrating the wall at the appropriate frequency, phase, and amplitude to accomplish global noise reductions within the passenger compartment. Generally, it can be seen that at the various accelerometer locations where vibration measurements, were taken, structure-borne vibration may be increased at certain locations away from where the AVAs are placed. This discovery was made by the inventors herein and represents recognition of the problem associated with ASC systems. The accelerometer locations marked with a y indicate locations where the AVAs are placed. For example, structure-borne vibration is increased at accelerometer locations 3, 5, 8–12, 29–30, and 32–36 away from where the AVAs are located. It should be understood that localized vibration at the location of the AVAs may be increased also, however, as the inventors discovered herein, this is not always the case. For example, when the structural response is moderately coupled to the compartment acoustics, the vibration may not be increased significantly or it may not be increased at all. When the structural response is very strongly coupled to the compartment acoustics, the vibration may stop altogether with a resultant large increase in noise reduction. FIG. 9a illustrates that the hybrid active-passive system is generally more effective than TVAs alone at reducing sound pressure levels in the compartment. FIG. 9b illustrates vibration levels at various positions for the hybrid active passive system. As a general observation, it can be seen that at positions away from the AVAs (those positions marked with an x), the vibration is generally reduced (on the average), or is at least the same as the baseline system. Only at four such accelerometer locations (the circled x's) measured was the vibration slightly higher.

In summary, from the foregoing, it should be apparent that the hybrid active-passive system of the present invention solves the problems of the passive TVA system standing alone, by effectuating a higher level of noise attenuation. Moreover, the hybrid also solves the problems associated with the ASC system standing alone, in that the hybrid system reduces the vibration at positions away from the AVAs locations that are increased when using AVAs alone. Through the novel application of the combination of passive resonant devices and active acoustic generators in the hybrid active-passive system to the noise and vibration problems, as described herein, both noise and vibration are simultaneously reduced at the desired locations and regions.

While several embodiments of the present invention have been described in detail, various modifications, alterations, and changes may be made by those of ordinary skill in the art without departing from the spirit and scope of the present invention as defined in the appended claims. It is intended that all such modifications, alterations, and changes fall within the scope of the appended claims and be considered part of the present invention.

What is claimed is:

1. An active system for reducing interior noise and vibration of an aircraft, said aircraft having a fuselage which includes a fuselage wall at least partially defining a passenger compartment, said fuselage and said passenger compartment being exposed to noise and vibration caused by at least one disturbance source interconnected to said fuselage wall by a support structure, said system comprising in combination:

(a) reference signal generating means for deriving at least one reference signal representative of at least one disturbance frequency of said at least one disturbance source, (b) a first plurality of passive resonant devices attached to at least one selected from a group consisting of:
   i) said support structure, and
   ii) said fuselage, (c) a second plurality of active acoustic producers for generating cancelling acoustic noise within said passenger compartment which are attached to at least one selected from the group consisting of:
   i) said support structure, and
   ii) said fuselage, said second plurality of active acoustic producers being attached at separate and distinct points from those points at which said first plurality of passive resonant devices are attached, (d) error sensor means for providing a plurality of residual error signals indicative of a residual acoustic noise at a plurality of locations within said passenger compartment, and (e) controller means for processing said at least one reference signal and said plurality of residual error signals and providing a plurality of cancelling signals to drive said plurality of active acoustic producers.

2. An active system of claim 1 wherein said second plurality of active acoustic producers are active inertial devices selected from a group consisting of:

(a) active vibration absorbers directly attached to said fuselage wall, (b) active vibration absorbers directly attached to said support structure intermediate said at least one disturbance source and said fuselage wall, and (c) active vibration absorbers attached to active mounts attached between said support structure and said at least one disturbance source.

3. An active system of claim 1 wherein said second plurality of active acoustic producers are loud speakers disposed within said fuselage.

4. An active system of claim 1 wherein said first plurality of passive resonant devices are a plurality of passive tuned vibration absorbers each of which exhibits a resonant frequency and where at least a portion are located substantially in a vicinity of a propeller wash from a propeller of a turboprop aircraft and which are tuned such that said resonant frequency of at least a portion of said plurality of passive tuned vibration absorbers substantially coincides with a blade passage frequency of said turboprop aircraft.

5. An active system of claim 1 wherein said second plurality of active acoustic producers are a plurality of active tuned vibration absorbers which control at least one harmonic of a predominant disturbance frequency of an aircraft.

6. An active system of claim 1 wherein said first plurality of passive resonant devices are passive tuned vibration absorbers and said second plurality of active acoustic producers are active vibration absorbers.

7. An active system of claim 1 wherein said reference signal generating means includes a first reference sensor adjacent a first power plant and a second reference signal adjacent a second power plant and each provides a reference signal to said controller means including at least one predominant operating frequency of a said first and second power plants.

8. An active system of claim 1 wherein at least one of said first plurality of passive resonant devices is a passive tuned vibration absorber and at least one of said second plurality of active acoustic producers is an active vibration absorber and where said passive tuned vibration absorber and said active tuned vibration absorber are substantially collocated and arranged in a parallel relationship within a hybrid device.

9. An active system of claim 8 wherein said hybrid device comprises a passive tuning mass flexibly suspended relative to a casing of said active vibration absorber.

10. An active system of claim 1 wherein at least one of said first plurality of passive resonant devices is located in a direct energy path between said at least one disturbance source and said passenger compartment and at least one of said second plurality of active acoustic producers is arranged to control noise generated within said passenger compartment from a flanking path.

11. An active system of claim 1 wherein at least one of said first plurality of passive resonant devices is located in a position to control vibration exposed to a passenger and at least one of said second plurality of active acoustic producers is arranged to control acoustic noise generated within said compartment by said at least one disturbance source.

12. An active system of claim 1 wherein at least one of said first plurality of passive resonant devices is located adjacent to one selected from a group consisting of:
   a) a passenger's seat, and
   b) a passenger's feet.

13. An active system of claim 1 wherein said first plurality of passive resonant devices control vibration at a first frequency and said second plurality of active acoustic producers control acoustic noise at a second frequency.

14. An active system of claim 1 wherein said first plurality of passive resonant devices are located at antinodes of said fuselage wall to control vibration of primary vibrational deflection shapes which are weakly coupled to acoustics of said passenger compartment and said second plurality of active acoustic producers are arranged to couple to secondary vibrational deflection shapes that are strongly coupled to said compartment acoustics to control noise generated therewithin.

15. An active system for reducing interior noise and vibration of an aircraft, said aircraft having a fuselage which includes a fuselage wall at least partially defining a passenger compartment, said fuselage and said passenger compartment being exposed to noise and vibration caused by at least one disturbance source interconnected to said fuselage wall by a support structure, said system comprising in combination:
   (a) reference signal generating means for deriving a reference signal representative of a disturbance frequency of said at least one disturbance source,
   (b) a passive resonant device attached to at least one selected from a group consisting of:
      ii) said support structure, and
      iii) said fuselage,
   (c) an active acoustic producer for generating cancelling acoustic noise within said passenger compartment attached to at least one selected from the group consisting of:
      i) said support structure, and
      ii) said fuselage, said active acoustic producer being attached at a separate and distinct point from a point at which said passive resonant device is attached
   (d) error sensor means for providing a residual error signal indicative of a residual acoustic noise within said passenger compartment, and
   (e) controller means for processing said reference signal and said residual error signal and providing a cancelling signal to drive said active acoustic producer.

16. An active system of claim 15 wherein said passive resonant device is included in a first plurality of passive resonant devices that are located at antinodes of said fuselage to control vibration of primary vibrational deflection shapes which are weakly coupled to acoustics of said passenger compartment and said active acoustic producer is included in a second plurality of active acoustic producers which are arranged to couple to secondary vibrational deflection shapes that are strongly coupled to said compartment acoustics to control noise generated therewithin.

17. An active system of claim 15 wherein said active acoustic producer is attached adjacent to said structural support of a turbofan aircraft and said passive resonant device is attached adjacent to said fuselage in a vicinity of a passenger sufficient to reduce vibration experienced by said passenger.

18. An active system of claim 15 wherein said active acoustic producer is attached adjacent to a propeller plane of a turboprop aircraft and said passive resonant device is attached adjacent to said fuselage in a vicinity of a passenger sufficient to reduce vibration experienced by said passenger.

19. An active system of claim 15 wherein said active acoustic producer is attached adjacent to a fuselage wall of a helicopter aircraft in a position to cancel gearbox noise and said passive resonant device is attached adjacent to said fuselage in a vicinity of a passenger sufficient to reduce vibration experienced by said passenger.

20. An active system of claim 15 wherein said active acoustic producer is attached adjacent to a nodal beam gearbox mounting assembly of a helicopter aircraft in a position to cancel gearbox noise and said passive resonant device is said nodal beam gearbox mounting assembly.

21. A system for reducing interior noise and vibration of an aircraft, said aircraft having a fuselage which includes a fuselage wall at least partially defining a passenger compartment, said fuselage and said passenger compartment being exposed to noise and vibration caused by first and second power plants interconnected to said fuselage wall by first and second support structures, said system comprising in combination:
   (a) reference signal generating means for deriving a first reference signal representative of a first disturbance frequency of said first power plant and a second reference signal representative of a second disturbance frequency of said second power plant,
   (b) a plurality of passive tuned vibration absorbers attached to at least one selected from a group consisting of:
      i) said support structure, and
      ii) said fuselage,
   (c) a plurality of active tuned vibration absorbers spaced apart from said plurality of passive tuned vibration absorbers for generating cancelling acoustic noise within said passenger compartment which are attached to at least one selected from a group consisting of:
      i) said support structure, and
      ii) said fuselage,
   (d) error sensor means for providing a plurality of residual error signals indicative of a residual acoustic noise at a plurality of locations within said passenger compartment, and
   (e) controller means for processing said first and said second reference signals and said plurality of residual error signals and providing a plurality of cancelling signals to drive said plurality of active tuned absorbers.

* * * * *